(12) United States Patent
Heien

(10) Patent No.: US 7,044,481 B2
(45) Date of Patent: *May 16, 2006

(54) WHEEL ASSEMBLIES FOR USE WITH LOAD BEARING PLATFORMS

(76) Inventor: Troy A. Heien, 5704 South View Rd., Laramie, WY (US) 82070

( * ) Notice: Subject to any disclaimer, the term of this patent is extended or adjusted under 35 U.S.C. 154(b) by 0 days.

This patent is subject to a terminal disclaimer.

(21) Appl. No.: 10/647,697

(22) Filed: Aug. 25, 2003

(65) Prior Publication Data

US 2004/0036235 A1  Feb. 26, 2004

Related U.S. Application Data

(63) Continuation-in-part of application No. 10/078,403, filed on Feb. 21, 2002, now Pat. No. 6,609,719, which is a continuation-in-part of application No. 09/630,566, filed on Aug. 3, 2000, now Pat. No. 6,357,765.

(51) Int. Cl.
*B62B 5/02* (2006.01)
(52) U.S. Cl. ............... 280/5.26; 280/5.2; 301/5.23
(58) Field of Classification Search ......... 280/5.26, 280/5.23, 5.2; 301/5.23–5.1
See application file for complete search history.

(56) References Cited

U.S. PATENT DOCUMENTS

| 722,433 | A | * | 3/1903 | Ritchie | 280/261 |
| 795,620 | A | * | 7/1905 | Jones | 301/5.23 |
| 1,326,679 | A | * | 12/1919 | MacBeth et al. | 301/5.23 |
| 6,357,765 | B1 | * | 3/2002 | Heien | 280/5.26 |
| 6,609,719 | B1 | * | 8/2003 | Heien | 280/5.26 |

FOREIGN PATENT DOCUMENTS

FR  2640204  *  6/1990  ............. 301/5.23

* cited by examiner

*Primary Examiner*—Anne Marie Boehler
(74) *Attorney, Agent, or Firm*—Roland H. Shubert

(57) ABSTRACT

A wheel assembly for supporting a load bearing platform includes a primary wheel and at least four secondary wheels that are of equal size. The primary wheel includes at least one planar member having an even number of axles at fixed locations extending perpendicularly therefrom with one secondary wheel mounted on each axle. The fixed locations are angularly equidistant apart and also equidistant from the central axis of the primary wheel. The diameter of each secondary wheel is greater than is the distance between locations, and adjacent secondary wheels are arranged to roll in separate, parallel paths.

5 Claims, 4 Drawing Sheets

WHEEL ASSEMBLIES FOR USE WITH LOAD BEARING PLATFORMS

This application is a continuation-in-part of U.S. patent application Ser. No. 10/078,403 that was filed on Feb. 21, 2002 now U.S. Pat. No. 6,609,719, which, in turn, is a continuation-in-part of U.S. patent application Ser. No. 09/630,566 of U.S. Pat. No. 6,357,765, filed on Aug. 3, 2000 and issued on Mar. 19, 2002.

TECHNICAL FIELD

This invention relates to wheel assemblies that are used to support load carrying platforms with increased safety, particularly when traversing rough surfaces and rolling over small obstacles.

More particularly, this invention relates to wheel assemblies that provide load carrying platforms with means to roll across small obstacles without wheel drag, and to provide braking means for the platform.

BACKGROUND ART

A large variety of load bearing platforms are used in industry to transport goods from on place to another or to serve as mobile instrument or tool stations and the like. Such platforms are typically supported upon casters or wheel assemblies, either fixed or swiveling, to provide a rolling support for the platforms.

A problem frequently faced in the use of such platforms is the tendency for wheels to drag when encountering small obstacles such as construction debris, uneven floor or sidewalk joints, and the like. That problem is particularly acute with platforms used in work environments in which the platform must cross electrical cords or pneumatic hoses that power other equipment. Further, cargo carrying platforms are sometimes loaded beyond their safe capacity, thus creating another hazardous condition.

There are a number of different wheel assemblies in the prior art that propose to address those problems. For example, wheel assemblies that include a primary wheel carrying a plurality of smaller, secondary wheels are shown in U.S. Pat. No. 3,208,544 to Colvin; U.S. Pat. No. 1,326,679 to Macbeth et al; U.S. Pat. No. 795,620 to Jones; and U.S. Pat. No. 722,433 to Ritchie. Wheel assemblies employing braking means used in association with walkers are described in U.S. Pat. No. 6,068,273 to Rao et al; in U.S. Pat. No. 5,112,044 to Dubats; and in U.S. Pat. No. 5,020,560 to Turbeville.

The wheel assemblies described in the cited prior art do not satisfactorily address the needs for wheel assemblies that surmount small obstacles without wheel drag, and prevent overloading of a mobile platform. This invention fills that need.

SUMMARY OF THE INVENTION

Wheel assemblies that are suitable for use to support load bearing platforms, in a first embodiment, comprise a primary wheel member having an even number, but at least four, secondary wheels mounted thereon. All of the secondary wheels are of equal size, are spaced apart a distance that is less than the secondary wheel diameter, and are fixed at equal distances from the axles of the primary wheel so that angularly adjacent secondary wheels overlap but travel in separate and parallel tracks. Brake means that effectively limit the load place upon the wheel assembly comprise a second embodiment of this invention.

Hence, it is an object of this invention to provide a wheel assembly that rolls over obstacles without wheel drag.

It is another object of this invention to provide a wheel assembly that provides a safety braking mechanism that prevents overloading of a cargo platform, yet is capable of transporting heavy loads.

Other objects and advantages of this invention will become evident from a study of the following description and accompanying drawings.

DESCRIPTION OF THE INVENTION

In a broad sense, applicant's invention comprises wheel assemblies to support a load carrying platform and to move that platform from place to place in a safe and convenient manner. One of those wheel assemblies is arranged to surmount obstacles without wheel drag. That assembly comprises a primary wheel that is arranged to rotate freely about a central axis. The primary wheel includes a generally circular planar member that supports a plurality, at least four, axle members, and each axle carries a secondary wheel. Each axle is at a fixed location on, and extends perpendicularly from, the planar member. The axle locations are angularly equi-distant apart and also equi-distant from the central axis.

All secondary wheels are of equal diameter and may be configured as a generally cylindrical disk. The diameter of each secondary wheel is greater than is the distance between angularly adjacent axles, resulting in overlap of adjacent secondary wheels. The axles and wheels are arranged such that two angularly adjacent wheels are in rolling contact with a surface at any one time, and each secondary wheel rotates independently of any other secondary wheel and of the primary wheel as well. That arrangement causes one wheel of an angularly adjacent pair to roll upon a surface in a separate and parallel track with the other wheel of the adjacent pair.

Figure 1:
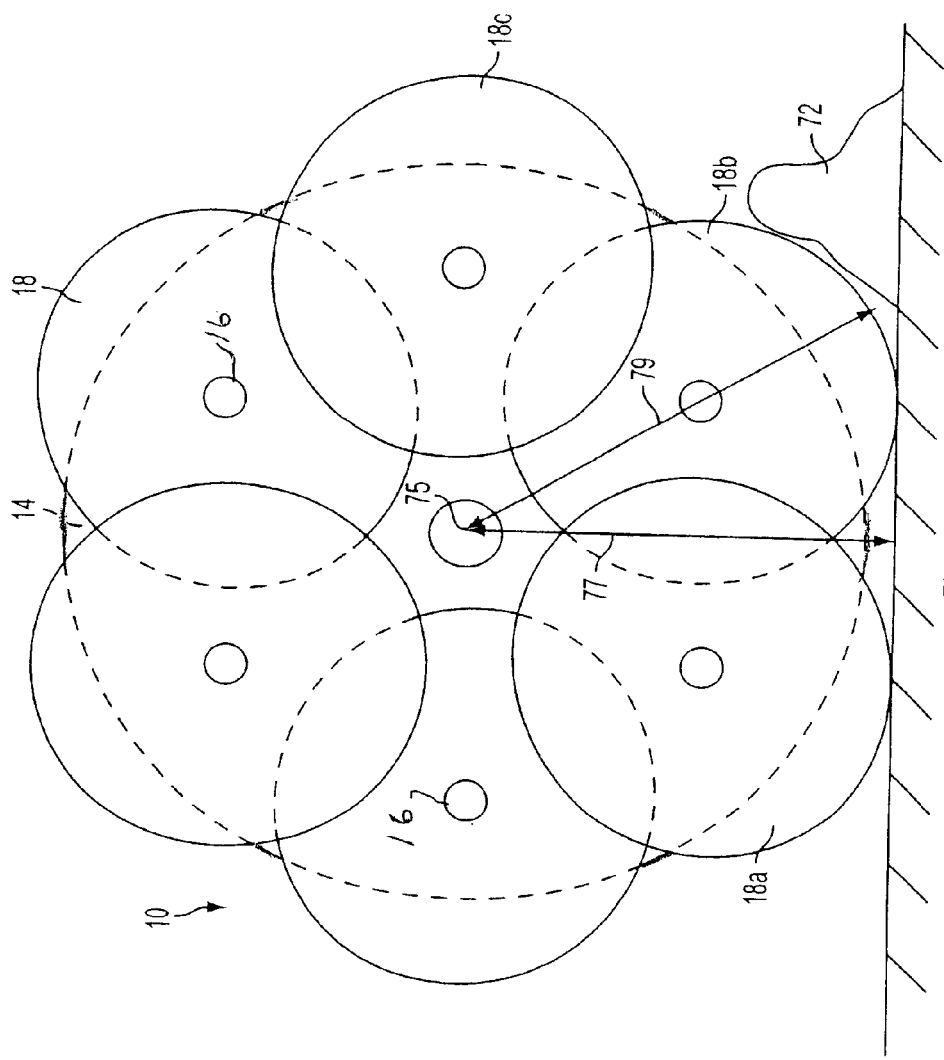
FIG. 1 is a partially broken away side view of a wheel assembly rolling over a surface and showing its operation in traversing an obstacle.

The mode of operation of applicant's obstacle traversing wheel assembly is illustrated in FIG. 1 that is a view of the assembly rolling across an obstruction. Turning now to that Figure, the wheel assembly 10 includes at least one primary wheel 14 that is arranged to rotate about a central axis 75. An even number of secondary wheels 18 are rotationally mounted on corresponding axle means 16 that extend perpendicularly from the primary wheel. At least four secondary wheels must be provided for the wheel assembly to function, and an assembly using either six or eight secondary wheels is preferred. Wheels 18 are spaced apart a distance that is less than one wheel diameter and are located equidistant from each other and from axles 16. As may be seen from the drawing, that arrangement causes adjacent secondary wheels to overlap, and two adjacent secondary wheels, shown as 18a and 18b, are in rolling contact with a surface being traversed at any one time.

Wheel assembly 10 is shown rolling along a surface 70 as it bumps into surface obstruction 72. Obstruction 72 typically might be an electrical cord or pneumatic line lying on a workplace floor, a small stone or branch on a parking lot or pavement surface, or an irregularity or depression in a sidewalk or other traversing surface. As assembly 10 moves to the right along an unobstructed surface, only the two lowermost, 18a and 18b, of the secondary wheels are in rolling contact with surface 70. The remaining secondary wheels and the primary wheel 14 are motionless. As secondary wheel 18b strikes obstruction 72, it stalls and causes a right-ward tilt of the entire wheel assembly 10, bringing secondary wheel 18c downward to roll over the obstruction. The force required to precipitate that rotational tilt is modest, amounting to little more than the force required to lift the wheel assembly (and the weight that it supports) a short distance. That distance comprises a span amounting to the difference in distance 77 between the central axis 75 of the wheel assembly 10 and surface 70 and the longest distance 79 between axis 75 and the circumference of secondary wheel 18b, in contact with the obstruction 72. Distance 77 may be viewed as being the effective radius of the wheel assembly, and twice that distance then constitutes the effective diameter of the wheel assembly. As may be appreciated, the structure of the wheel assembly allows it to literally walk over small obstructions, and much of the lifting force required is supplied by the forward momentum of the wheel and its supported weight.

As has been set out before, the wheel assembly of this invention requires a minimum of four secondary wheels (and preferably six or eight) that are equi-spaced around the circumference of a primary wheel means. Because the diameter of each secondary wheel is greater than is the distance between wheels, adjacent wheels overlap and must be horizontally offset one from the next. Thus, when the wheel assembly traverses a surface, the two wheels in contact with that surface follow separate, parallel tracks, one wheel in each track. That geometry, separate and parallel tracking of adjacent wheels, that is pivotally attached to a load-supporting frame through a conventional yoke or horn.

Figure 2:
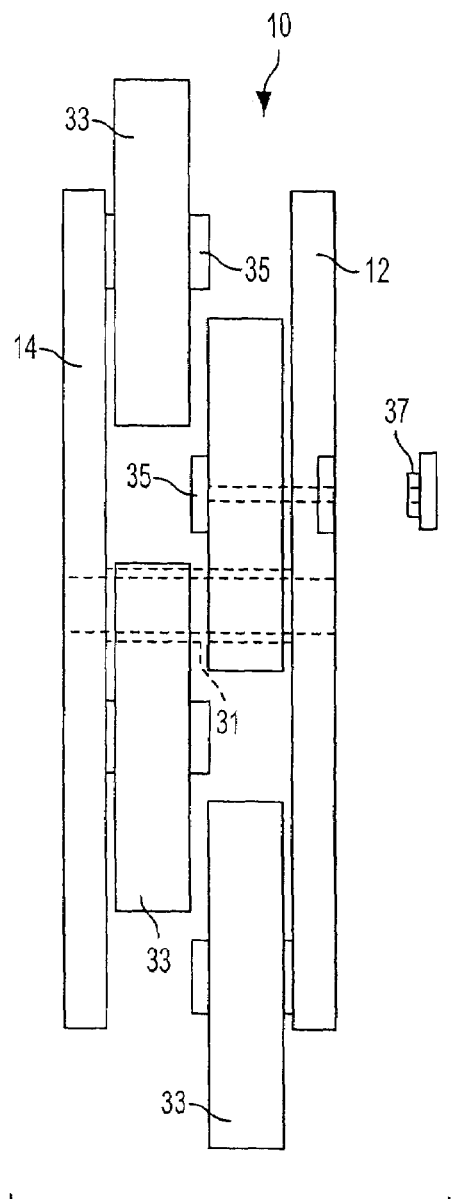
FIG. 2 is a first embodiment of a wheel assembly that allows a load carrying platform to roll across a small obstruction without wheel drag.

FIG. 2 illustrates a first detailed embodiment of wheel assembly 10 that was described in relation to FIG. 1. This embodiment includes a primary wheel comprising a pair of wheel holders 12 and 14 that are arranged to rotate about a central axis 75. The two wheel holders are secured one to the other in a held apart relationship by way of a cylindrical spacer and bearing member 31 disposed axially between the two wheel holders. Wheels 33 of this embodiment are disk shaped and are mounted on stub axles 35 that extend inwardly from the wheels holders 12 and 14. Axles 35 are secured to the wheel holders as by locking nut 37 or other suitable means. The axles and wheel holders are arranged so that adjacent wheels are journeled one from holder 12 and the next from holder 14. Further, adjacent wheels 33 are located at fixed points equidistant one from the other and from the center of spacer member 31 at a distance less than the diameter of the wheels, thus causing adjacent wheels to overlap. Bearing member 31 is sized such that the two wheel holders are fixed apart a distance slightly greater than twice the thickness of an individual secondary wheel 33, thereby allowing adjacent wheels to overlap and to also rotate freely.

Figure 3:
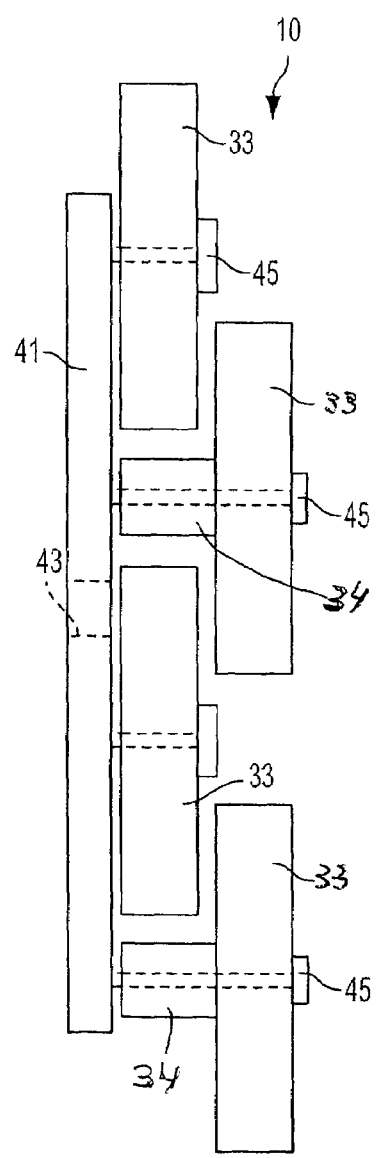
FIG. 3 is another embodiment of the wheel assembly of FIG. 1.

A second embodiment of the wheel assembly is illustrated in FIG. 3. That embodiment employs but a single wheel holder 41 that is provided with a central bore 43 journaled for rotation about a shaft or axle. An even number of stub axles 45, one for each wheel, are fixed to holder 41 and one wheel 33 is mounted on each axle. A spacer means 34, somewhat longer than the width of a single wheel and preferably cylindrical in form, is mounted next to the holder 41 on alternate axles so as allow adjacent wheels to overlap without interference. Spacer 34 may be formed as a separate element, or may be formed as an integral boss projecting from one side of wheel 33. As in the embodiment of FIG. 2, wheels 33 are all the same diameter and are equi-spaced, one from another, at a distance less than that of the wheel diameter.

As has been set out before, the wheel assembly of this invention requires a minimum of four secondary wheels equi-spaced around the circumference of a primary wheel means. Because the diameter of each secondary wheel is greater than is the distance between wheels, adjacent wheels overlap and are offset one to another. Thus, when the wheel assembly traverses a surface, the two wheels in contact with that surface follow separate but parallel tracks, one wheel in each track. That geometry, separate and parallel tracking of adjacent wheels, tends to increase the stability of a wheel assembly that is pivotally attached to a load-supporting frame through a conventional yoke or horn arrangement. It can further be appreciated that the overlapping arrangement of adjacent secondary wheels can best be obtained through use of an even number of secondary wheels, preferably four, six or eight, and most preferably six or eight.

Figure 4:
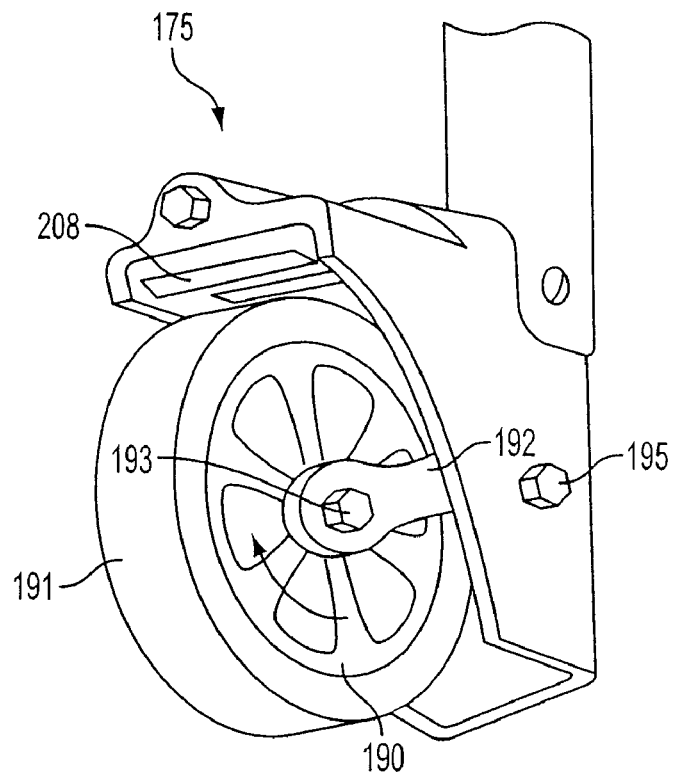
FIG. 4 is an oblique view of a wheel and brake assembly for a load carrying platform.
Figure 5:
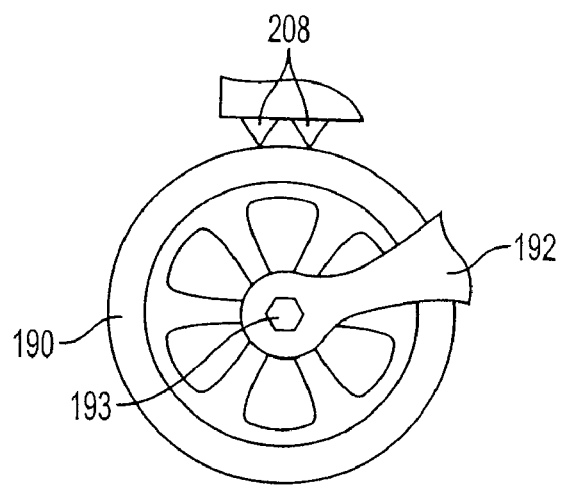
FIG. 5 is a semi-schematic side view of the wheel and brake assembly of FIG. 4.
Figure 6:
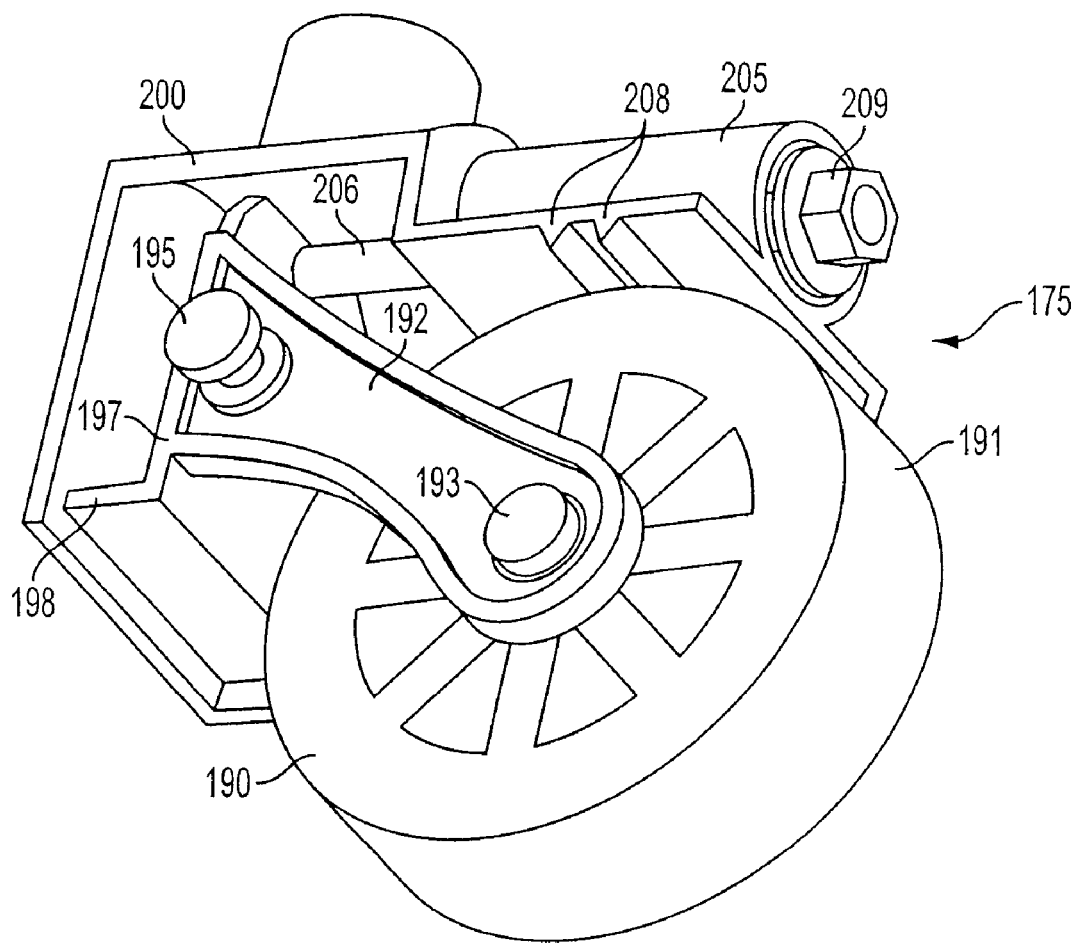
FIG. 6 is a second oblique, and partially broken away, view of the wheel and brake assembly of FIG. 4.

A different embodiment of this invention is illustrated in FIGS. 4, 5, and 6 provides a wheel and brake assembly 175 that is advantageously mounted in combination with two or more of the wheel assemblies of FIGS. 2 and 3 to support a load carrying platform. Referring specifically to FIGS. 4, 5, and 6, the assembly 175 includes a caster 190 that is rotationally mounted between the arms of yoke 192 by means of axle 193 that extends between the yoke arms. Yoke 192 is cantilevered from pivot member 195 and is arranged so that a downward pressure exerted upon rear legs 170, 171 upon pivot 195 causes the yoke axle end and caster 190 to rise relative to the yoke pivot end.

Yoke 192 terminates at its pivot end in an L-shaped bracket having a vertical arm 197 and a horizontal stop member 198. Stop member 198 serves to limit the rotational travel of the yoke arms about pivot 195 by engagement with the inner side of the assembly housing 200. A spring or pneumatic resistance may be contained within cylinder 205. That resistance acts through connecting rod 206, vertical arm 197, and yoke arms 192 to urge caster 190 downwardly in opposition to the upward force on the caster that is produced by a load upon the platform that is supported by the wheel assemblies. One or more brake pads 208 are mounted on the underside of assembly housing 200 at a location above caster axle 193.

When enough downward force is applied to the load bearing platform supported by the wheel assemblies, the caster is urged upwardly to the point that caster tread 191 contacts and drags against brake pads 208 thus inhibiting or stopping rotation of the caster. The magnitude of the force produced by resistance 205 is preferably adjustable so that it can be adjusted to the load carrying capacity of the platform. Such adjustment may be obtained by an appropriate selection of the spring or pneumatic resistance member contained within housing 205, or through a threaded adjustment means 209 that act to change the spring tension or pneumatic resistance. That arrangement prevents a user of the load carrying platform from dangerously overloading the platform, and also to apply a brake to the movement of the platform by pressing down on a handle or frame of the platform.

The wheel assemblies of this invention has been shown and described with respect to certain embodiments thereof and that description is for the purpose of illustration and not of limitation. Other variations and modifications of the described invention will be apparent to those skilled in the art and are included within the scope of the invention as set out in the appended claims.

The invention claimed is:

1. A wheel assembly that is arranged to support a load carrying platform and to roll on a surface, comprising:
   a generally planar primary wheel that is rotatable about a central axis, said primary wheel comprising two planar members secured one to the other, each said planar member having a plurality of stub axles at fixed locations extending perpendicularly toward said other planar member, said locations being angularly equidistant apart and equidistant as well from the central axis; and
   an even number of secondary wheels, one wheel mounted on each stub axle, said secondary wheels being of equal size and configured as a generally cylindrical disk having a diameter greater than the distance between angularly adjacent stub axles, said axles and wheels arranged such that at least two angularly adjacent wheels are in rolling contact with said surface at any one time, each of said secondary wheels arranged to freely rotate independently of any other secondary wheel, and independently as well of said primary wheel, said wheels positioned along their respective axles in a manner causing each wheel of an angularly adjacent pair of wheels that is in contact with said surface to roll along a separate and parallel track.

2. The wheel assembly according to claim 1 wherein said planar members are parallel and fixed apart a distance greater than twice the width of a secondary wheel.

3. The wheel assembly according to claim 2 wherein said axles are arranged such that the first of any two adjacent secondary wheels is supported by an axle fixed to one of said parallel planar members, and the second of any two adjacent secondary wheels is supported by an axle fixed to the other of said parallel planar members.

4. The wheel assembly according to claim 1 having six secondary wheels.

5. The wheel assembly according to claim 1 having eight secondary wheels.

* * * * *